(12) United States Patent
Choi

(10) Patent No.: US 6,577,499 B1
(45) Date of Patent: Jun. 10, 2003

(54) ARM HARNESS WITH A CONTROL PANEL FOR OPERATING MULTIPLE ELECTRONIC DEVICES

(76) Inventor: Kyu Suk Choi, 302-404 Pueongmdae Apt., 1071 Pu Jong-Dong, Ik San-Ci, Chun Ra Buk-Do (KR)

( * ) Notice: Subject to any disclaimer, the term of this patent is extended or adjusted under 35 U.S.C. 154(b) by 0 days.

(21) Appl. No.: 10/005,339

(22) Filed: Dec. 7, 2001

(51) Int. Cl.[7] .............................................. G06Z 1/16
(52) U.S. Cl. ...................................... 361/683; 361/686
(58) Field of Search ................................. 361/679–686

(56) References Cited

U.S. PATENT DOCUMENTS

| | | | | |
|---|---|---|---|---|
| 5,742,251 A | * | 4/1998 | Gerber | 342/45 |
| 5,742,939 A | * | 4/1998 | Williams | 2/69 |
| 5,966,226 A | * | 10/1999 | Gerber | 359/159 |
| 6,251,080 B1 | * | 6/2001 | Henkin et al. | 600/490 |
| 6,324,053 B1 | * | 11/2001 | Kamijo | 361/683 |

* cited by examiner

*Primary Examiner*—Darren Schuberg
*Assistant Examiner*—Yean-Hsi Chang

(57) ABSTRACT

The present invention relates to an arm harness with a control panel for operating multiple electronic devices contained by the arm harness. The present invention enables a user to conveniently carry electronic devices, such as a cellular phone, an audio player (e.g., tape player, mini-tape player, CD player, etc.). The present invention enables a user to perform other activities by freeing up the user's hands while enabling the user to enjoy music or other recording, communicating by a cell phone etc. The present invention also facilitates transportation of electronic devices in containers within the arm harness of the present invention. The control panel may include a display and control buttons that operate the electronic devices contained by the arm harness. In addition, the control panel may control the sound and other audio qualities emitted by the electronic devices attached to the control panel.

6 Claims, 4 Drawing Sheets

FIG. 3-a
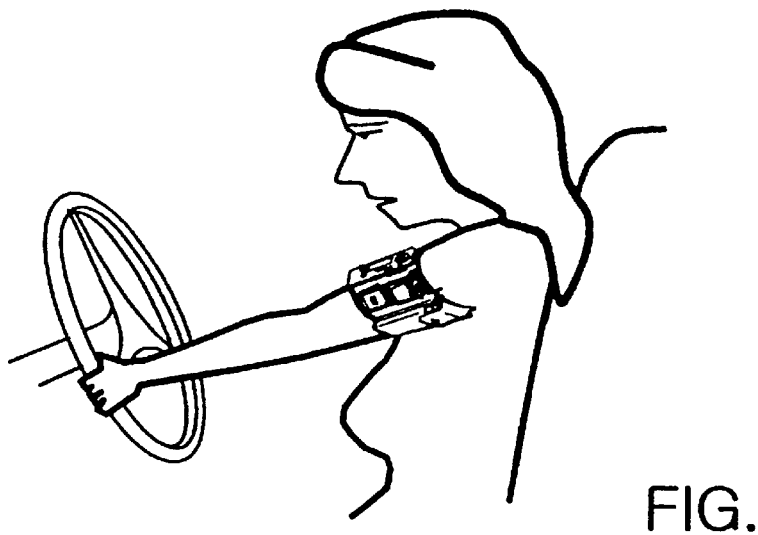
FIG. 3-b
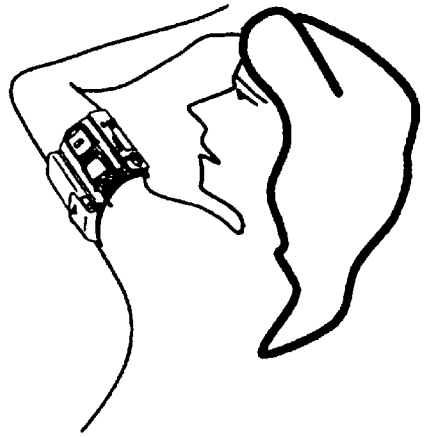
FIG. 3-c

US 6,577,499 B1

ARM HARNESS WITH A CONTROL PANEL FOR OPERATING MULTIPLE ELECTRONIC DEVICES

FIELD OF INVENTION

The present invention relates to an arm harness, in particular to an arm harness with a control panel for operating multiple electronic devices wherein the arm harness provides multiple containers for securely holding the multiple electronic devices.

BACKGROUND OF THE INVENTION

Generally, individuals may carry multiple electronic devices in pockets, in bags (e.g., purses or brief cases), or even in their hands. However, performing other activities may be difficult and inconvenient, such activities may include exercising, riding a bike or scooter, jogging, traveling, shopping or commuting in general. Oftentimes, individuals are restricted in activities or tasks by having to carry cellular phones and other electronic devices.

These and other drawbacks exist with current carrying options for various electronic devices.

SUMMARY OF THE INVENTION

The present invention relates to an arm harness with a control panel for operating multiple electronic devices contained by the arm harness. The present invention enables a user to conveniently carry electronic devices, such as a cellular phone, an audio player (e.g., tape player, mini-tape player, CD player, etc.) and other devices. The present invention enables a user to perform other activities by freeing up the user's hands while enabling the user to enjoy music or other recording, communicating by a cell phone, etc. The present invention also facilitates transportation of electronic devices in containers within the arm harness of the present invention. The control panel may include a display and control buttons that operate the electronic devices contained by the arm harness. In addition, the control panel may control the sound and other audio qualities emitted by the electronic devices attached to the control panel.

As illustrated in FIG. 3-a, the present invention enables users to conveniently answer calls from a cellular phone while performing other activities, such as operating an automobile, taking a walk, shopping, exercising, or simply for the sake of convenience. As seen in FIGS. 3-b and 3-c, users of the present invention may attach the present invention to the user's arm to enable the user to easily and conveniently perform other activities. In particular, the user's hands are free to carry other items and perform other tasks. In one example, the user may wear the present invention on an upper part of the user's arm. In another example, the user may wear the present invention on a lower or other part of the user's arm. In addition, the user may sling the present invention around the user's shoulder or across the user's chest. The present invention also facilitates listening to audio recordings and also for making recordings. The present invention further enables users to perform multiple acts simultaneously. The control panel may also include a timer, an alarm or other scheduling mechanism.

According to an embodiment of the present invention, an arm harness for carrying electronic devices comprises a control panel comprising a first electronic connection for controlling a first electronic communication device and a second electronic connection for controlling a second electronic audio device, the control panel comprising multiple control buttons for controlling audio generated by the first electronic communication device and the second electronic audio device; a first container for securely holding the first electronic communication device, the first electronic communication device being connected to the control panel by a first wire; and a second container for securely holding the second electronic audio device, the second electronic audio device being connected to the control panel by a second wire; wherein the control panel comprises a digital display and a speaker for emitting audio generating by the first electronic communication device or the second electronic audio device.

In addition, the control panel further comprises a clock, an alarm, a microphone, an earphone set and an elastic portion and an attachment mechanism for securely attaching the arm harness to a portion of a user's arm, wherein the first and second containers comprise a plastic material.

BRIEF DESCRIPTION OF THE DRAWINGS

FIGS. 3-a, 3-b and 3-c show how the present invention may be used, according to an embodiment of the present invention.

DETAILED DESCRIPTION OF THE PREFERRED EMBODIMENTS

Figure 1:
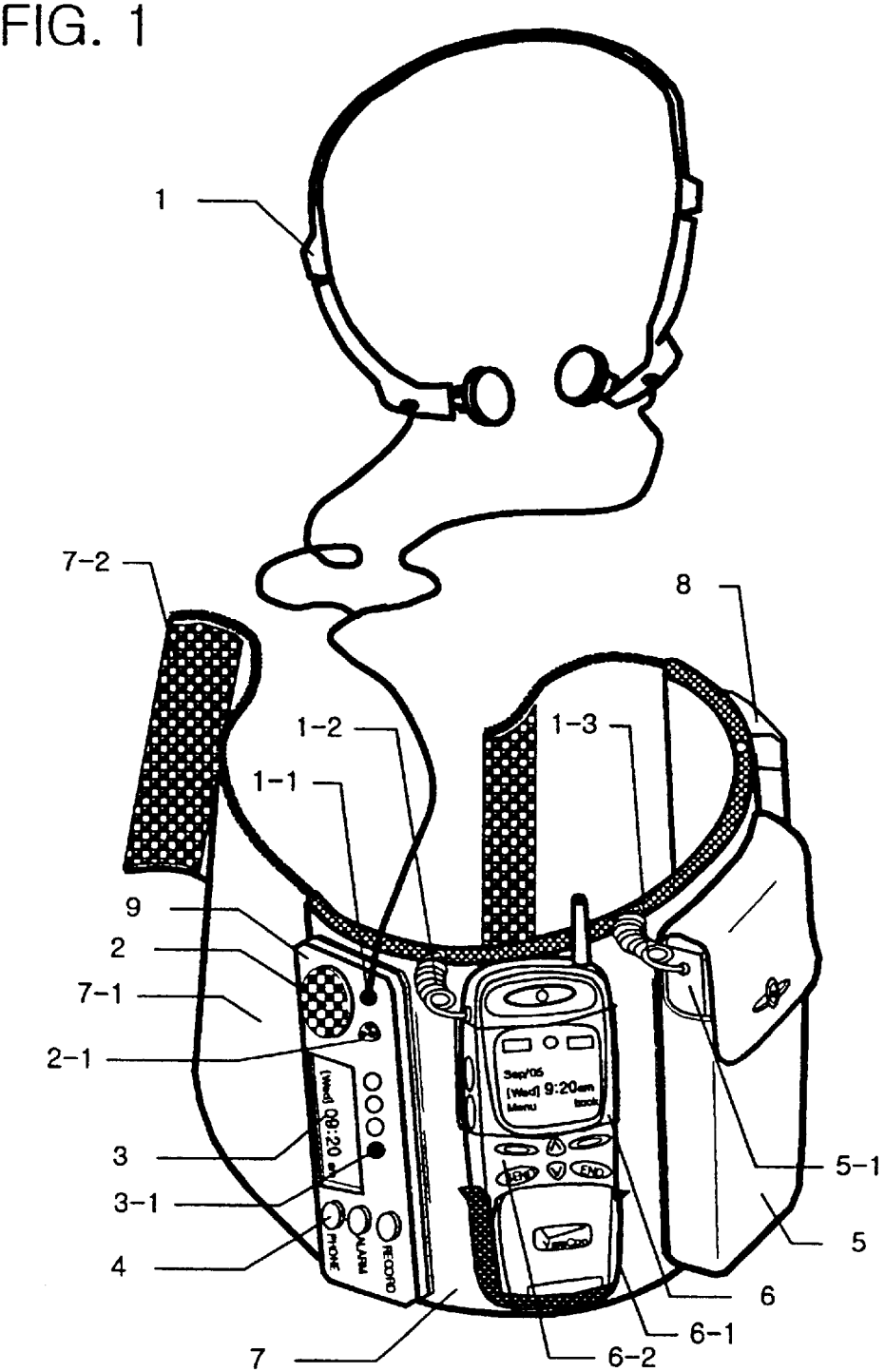
FIG. 1 is an overview of an arm harness, according to an embodiment of the present invention.
Figure 2:
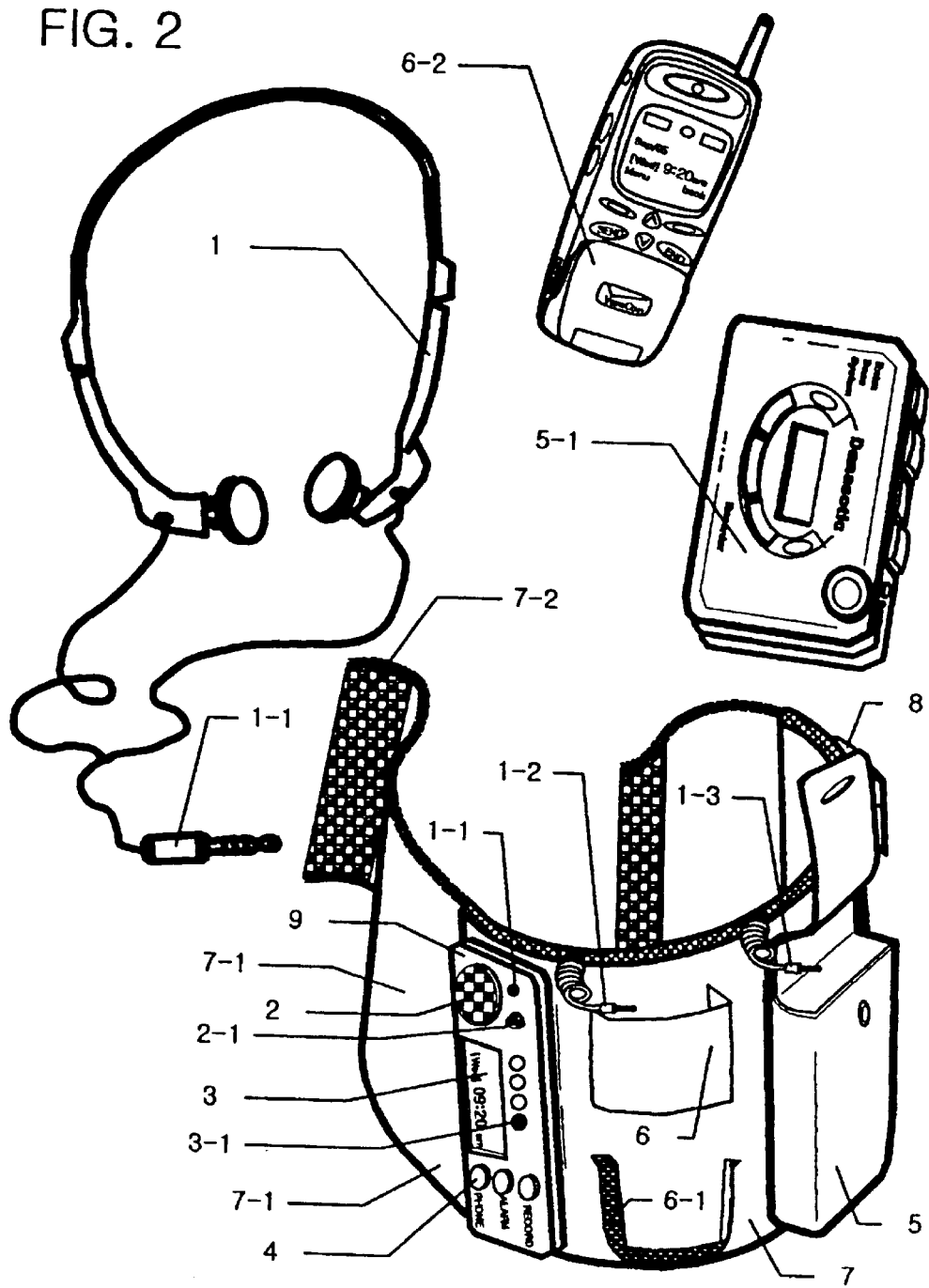
FIG. 2 is another view of an arms harness and items to be contained, according to an embodiment of the present invention.
Figure 4:
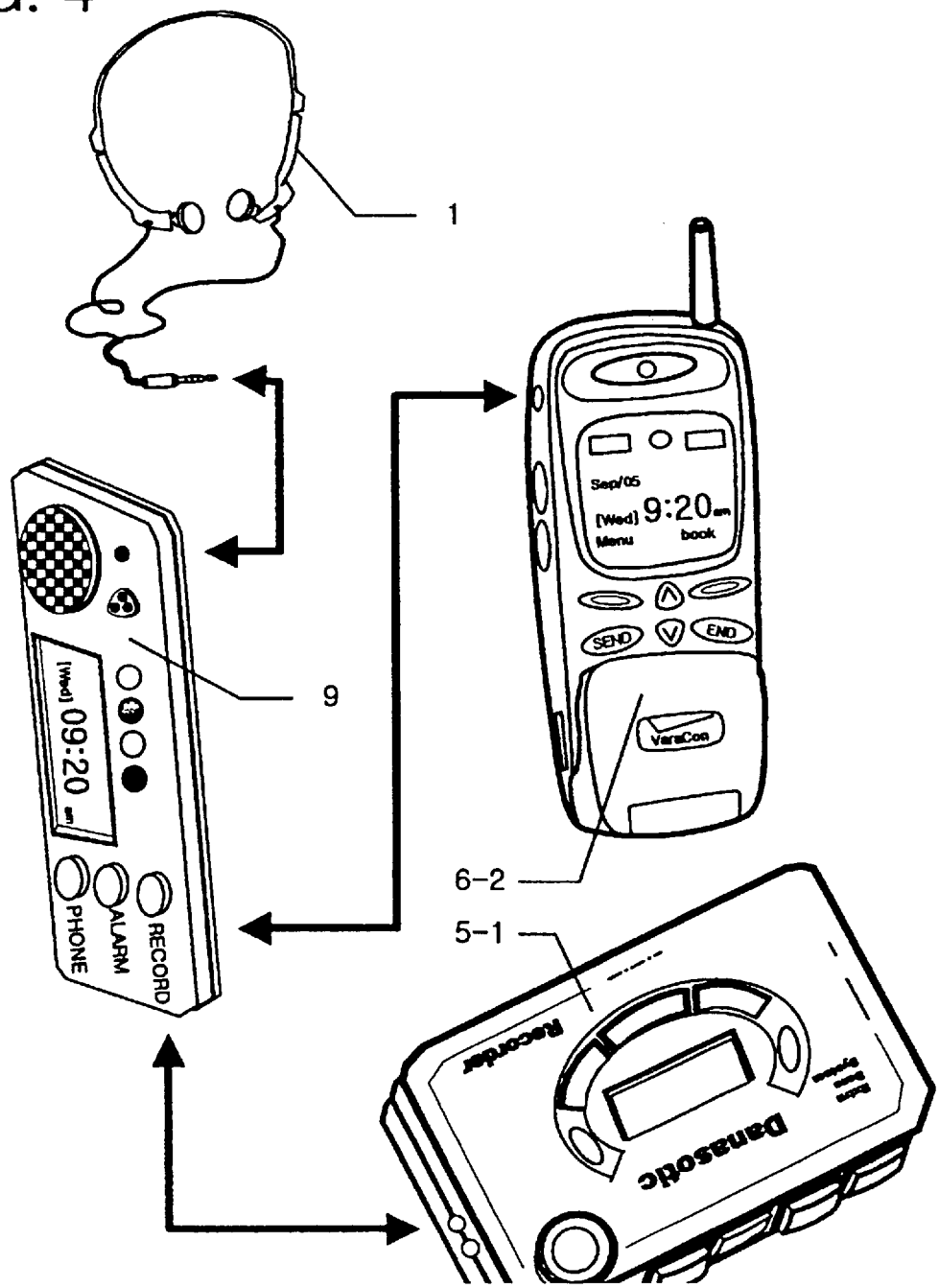
FIG. 4 shows how the items may be contained in the present invention, according to an embodiment of the present invention.

The present invention is directed to an arm harness with a control panel for operating and/or controlling multiple electronic devices contained in multiple customized containers of the arm harness. For example, as shown in FIGS. 1 and 2, the arm harness of the present invention may have a cell phone holder 6-1 for securely holding a cell phone 6-2, which may be connected to control panel 9 by a cell phone jack 1-2. The control panel 9 may be used to control the voice data received by the cell phone through headphone 1 and perform other functions related to the cell phone, such as forwarding calls, etc. The control panel may also include a microphone 2-1 from which a user's voice data may be communicated to the cell phone. The control panel 9 may control the volume and/or other audio characteristics of any device attached to the control panel. The arm harness of the present invention may provide an audio player holder 5 for securely holding an audio player 5-1, such as a tape player, CD player or other device. The audio player 5-1 may be attached to the control panel by audio player jack 1-3.

According to one example, the holders 5 and 6-1 may be formed of plastic or other durable material. Both ends of the arm harness may be extended by an elastic portion 7-1 where the ends may be attached by various attachment mechanism, such as Velcro, snaps, buttons, etc. The elastic portions 7-1 combined with the attachment mechanism provide a close fit around the user's arm or other convenient portion of the user's body.

As shown in FIG. 2, control panel 9 is attached on an external surface of the arm harness of the present invention. A cellular phone holder may further include a cellular phone-holding panel 6 and a cellular phone holder 6-1. The cellular phone-holding panel 6 may include a transparent elastic material to enable cellular phones of varying sizes to fit snuggly in the cellular phone holder. Outputs from an audio player and other electronic devices contained by the arm harness may be connected by electric wires and jacks provided by the arm harness to the control panel 9, which further provides selection buttons 4, a speaker 2, a microphone 2-1 and other controls.

The control panel 9 attached to the arm harness 7 enables the a user to make audio selections. For example, while the audio player is securely contained in the holder 5, the user may make selections, control the sound and perform other operations through the control panel 9. As a result, audio may be heard from speaker 2, voice data may be received by microphone 2 and the user may privately hear audio through earphone set 1. In another example, if a cellular phone rings while the user is listening to the audio, such as music, the user may select a control button designated for the cellular phone to answer the call or perform other operations, such as directing the call to voicemail or forwarding the call. A display 3-1 may include a digital clock, timer and/or alarm. If a timer is set, an alarm may be heard through speaker 2.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. An arm harness for carrying electronic devices comprising:

a control panel comprising a first electronic connection for controlling a first electronic communication device and a second electronic connection for controlling a second electronic audio device, the control panel comprising multiple control buttons for controlling audio generated by the first electronic communication device and the second electronic audio device;

a first container for securely holding the first electronic communication device, the first electronic communication device being connected to the control panel by a first wire; and a second container for securely holding the second electronic audio device, the second electronic audio device being connected to the control panel by a second wire;

wherein the control panel comprises a digital display and a speaker for emitting audio generating by the first electronic communication device or the second electronic audio device.

2. The arm harness of claim 1, wherein the control panel further comprises a clock and an alarm.

3. The arm harness of claim 1, wherein the control panel further comprises a microphone.

4. The arm harness of claim 1, further comprising an earphone set.

5. The arm harness of claim 1, further comprising an elastic portion and an attachment mechanism for securely attaching the arm harness to a portion of a user's arm.

6. The arm harness of claim 1, wherein the first and second containers comprise a plastic material.

* * * * *